United States Patent Office 3,555,071
Patented Jan. 12, 1971

3,555,071
ISOCYANATOSTILBENES
Durvasula V. Rao, Hamden, Adnan A. R. Sayigh, North Haven, and Henri Ulrich, North Branford, Conn., assignors to The Upjohn Company, Kalamazoo, Mich., a corporation of Delaware
No Drawing. Filed Oct. 17, 1967, Ser. No. 675,776
Int. Cl. C07c 93/14, 119/04
U.S. Cl. 260—453                     19 Claims

ABSTRACT OF THE DISCLOSURE

Mono- and diisocyanato-stilbenes having in one phenyl ring at least one isocyanato group and, in the other phenyl ring, from 1 to 3 alkoxy substituents are prepared by phosgenation of the corresponding amines. The latter are prepared by conventional procedures. Both cis- and trans-isomers of the stilbenes are described. The monoisocyanato and mono-amino-stilbenes are useful, by virtue of fluorescence in U.V. light, as optical brightening agents, for "tagging" molecules containing active H atoms (for the isocyanates) or anhydride groups (for the amines) and in the preparation of photoresist polymers. The diisocyanates and diamines are useful in the preparation of light sensitive polymers.

BACKGROUND OF THE INVENTION

Field of the invention

This invetnion relates to novel stilbene derivatives and to their method of preparation and to their use in the preparation of light sensitive products, and is more particularly concerned with novel alkoxy-substituted mono- and diisocyanato-stilbenes and with the novel mono- and diamines which are intermediates therefor, and with processes for synthesizing novel photosensitive compounds from said novel isocyanato- and aminostilbenes.

Description of the prior art

A limited number of isocyanato-stilbenes have been reported in the literature. Peck et al., J. Am. Chem. Soc. 74, 467, 1952 have prepared 2- and 4-isocyanato-4'-dimethylaminostilbene. Bertsch et al., J. prakt Chem. 11, 225, 1960 have prepared 2-isocyanatostilbene, 4-isocyanatostilbene and 4,4'-diisocyanatostilbene. We have now found that certain alkoxy-substituted isocyanatostilbenes can be prepared. We have found also that these alkoxy-substituted isocyanatostilbenes, and the corresponding amino compounds from which they are prepared by phosgenation, possess particularly useful properties which are markedly superior to those of the above known isocyanatostilbenes.

SUMMARY OF THE INVENTION

Accordingly, in one aspect, the present invention comprises novel compounds having the formula:

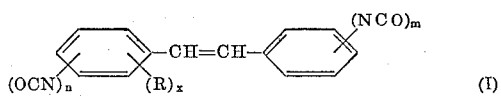

(I)

wherein R represents lower-alkoxy, $n$ is an integer from 0 to 1, $m$ is an integer from 1 to 2, and $x$ is an integer from 1 to 3, provided that the sum of $n+m$ is not greater than 2.

The present invention also comprises the amines corresponding to the above isocyanates (I), which amines are intermediates in the preparation of said isocyanates (I), as will be discussed hereinafter, and which have the formula:

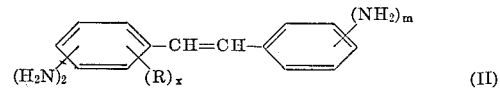

(II)

wherein R, $n$, $m$, and $x$ have the significance above defined. With the exception of 4-methoxy-4'-aminostilbene the amines of Formula II have not been described hitherto.

It is to be noted that the isocyanates (I) and the amines (II) can exist both in cis and trans forms. It is to be understood that both the cis and trans isomers of all of said novel compounds, as well as mixtures of said isomers, are included within the scope of this invention.

The term "lower-alkoxy" means alkoxy of from 1 to 6 carbon atoms, inclusive, such as methoxy, ethoxy, propoxy, butoxy, pentyloxy, hexyloxy, and isomeric forms thereof.

The monoisocyanates of formula I above are useful in that they can be reacted with active-hydrogen containing fibers, filaments and the like, to give products which, by virtue of the double bond present in the moiety of the compound (I), fluoresce on irradiation with ultraviolet light. Accordingly, the monoisocyanates are useful as optical brightening agents by incorporation into fabrics, fibers, and like materials made of cotton, silk, feathers, wool, cellulosic materials such as wood, jute, flax, hemp, paper, and the like, all of which contain active hydrogen atoms (i.e. hydrogen atoms which give a positive response in the Zerewitinoff reaction, J. Am. Chem. Soc. 49, 3181, 1927). When used for the above purpose the monoisocyanates (I) are incorporated into the active hydrogen containing material in accordance with conventional procedures. For example, the mono-isocyanates (I) can be dissolved or dispersed in a volatile inert organic medium such as hexane, benzene, toluene, xylene, chlorobenzene, o-dichlorobenzene, tetrachlorethane, acetone, methyl ethyl ketone, ethyl acetate, dioxane, dimethylsulfone, and the like, and the resulting mixture can be applied to the active hydrogen material by coating or spraying or by dipping the latter in a bath containing the isocyanate composition. Interaction of the monoisocyanate (I) and the active hydrogen contianing material generally takes place spontaneously without the necessity to apply heat. The inert organic carried medium is subsequently removed, and, if necessary, is recovered by vacuum drying or like techniques. The monoisocyanate (I) can be applied to the active hydrogen material after the latter has been formed into a finished article or, in the case of fabrics and like materials which are fabricated from fibers, filments, and the like, the monoisocyanate (I) can be applied to the latter prior to fabrication of a desired end product.

Alternatively, the monoisocyanates (I) can be converted to stable, water-soluble derivatives which can be incorporated in aqueous treating baths such as those commonly employed in applying optical brighteners to textile and like materials. The methods commonly employed in this art are described in Encyclopedia of Chemical Technology, Edited by Kirk-Othmer, second edition, volume 3, pp. 737 to 748, 1964, Interscience, New York. The monoisocyanates (I) can be converted to water-soluble derivatives, suitable for use in the above manner, in a variety of ways. For example, said monoisocyanates (I) can be reacted with alkanolamines such as ethanolamine, diethanolamine, diisopropanolamine, and the like, to form the corresponding hydroxyalkylureas. Alternatively, said monoisocyanates (I) can be reacted with an equimolar proportion of a polyhydric alcohol such as glycerol, trimethylolpropane, dipropylene glycol, 1,2,3-hexanetriol, butanediol, hexanediol, and the like, to form the corresponding hydroxyalkyl carbamates which exhibit the required water-solubility. In a further alternative said monoisocyanates (I) can be reacted with an equimolar proportion of a polycarboxylic acid such as maleic acid, fumaric acid, oxalic acid, phthalic acid, succinic acid, and the like, to form the corresponding mono- or polycarboxy substituted amide which can be converted to the corresponding potassium, sodium, or like water-soluble salt.

Similarly, the monoamines of Formula I can be converted to water-soluble derivatives which are employed as optical brightening agents in accordance with the procedures set forth above. For example, said amines can be reacted, using procedures well-known in the art, with dicarboxylic acids such as those exemplified above or with the anhydrides thereof, to form the corresponding half-amides of said acids. The half-amides can then be converted to the corresponding potassium, sodium, or like water-soluble salts.

The monoisocyanates (I) can also be employed as analytical tools in biochemical and like research. For example, the metabolic processes undergone by pharmaceutical agents containing one or more active hydrogen atoms in the molecule, or by proteinaceous materials and the like, in the human or animal body can be followed by tagging the molecule of said material by reaction with the monoisocyanate (I) thereby rendering said material fluorescent under the influence of ultra violet light. The subsequent progress of the tagged molecule can be followed by observing the appearance of the fluorescence corresponding to the tagged material at various sites in the human or animal organism.

Both the mono- and polyisocyanates of Formula I and the mono- and polyamines of Formula II are also useful in the preparation of photoresist resins, light sensitive polymers and the like. For example, light sensitive polymers can be prepared by incorporating the isocyanates of the Formula I into elastomeric polyurethanes by replacing part or, in the case of the diisocyanates of Formula I, the whole of the polyisocyanate normally used by an isocyanate of the Formula I; conventional procedures for the synthesis of such polyurethanes are described by Saunders et al., Polyurethanes, Chemistry and Technology, Part II, Interscience Publishers, 1964, pp. 299–451. The elastomers so obtained can be formed into any desired shape by molding, extruding, blowing and like procedures and then the finished product can be cured by irradiation using light energy of the appropriate wavelength whereby crosslinking occurs between the photosensitive double bonds introduced into the polymer molecule by the isocyanate (I).

Similarly, the amines (II) can be incorporated into polyamides, polyimides, and like polymers using procedures well-known in the art for the preparation of such polymers from diamines, the amines (II) being used as part or as the whole of the diamine component used to prepare the polymer. Representative procedures for the preparation of polyamides are those shown in Kirk-Othmer, ibid, vol. 10, p. 924 et seq. Representative procedures for the preparation of polyimides are those shown, for example, in U.S. Pats. 3,249,588; 3,247,165; 3,234,181; 3,179,634; 3,179,632; and 3,179,630. Said polyimides and polyamides can be formed into any desired shape by molding, extruding, blowing and like techniques and the finished product can be cured by irradiation using light energy of the appropriate wavelength whereby crosslinking occurs between the photosensitive double bonds introduced into the original polymer molecule via the amine (II).

The isocyanates of Formula I and/or the amines of Formula II can be used in the preparation of photoresist resins. Thus, said compounds (I) and/or (II) can be incorporated into polymers which are useful as auxiliaries in the photographic reproduction art. For example, said polymers can be applied as a solution to paper, metal, and like film supports normally employed in the reproduction art, to form a film on said support. Using the supported film so produced, it is possible to produce prints from negatives, e.g., lined, screened or half tone negatives or diapositives, by interposing the negative between a source of light and the supported film. The photosensitive polymer in those portions of the supported film which receive light is crosslinked by the action of the light and rendered insoluble. The amount of crosslinking is directly proportional to the amount of light received. After exposure of the film the polymer which has not been affected by the light is dissolved out by means of a solvent, leaving the crosslinked, insoluble, light-sensitized polymer on the surface of the film support in the form of a positive image corresponding to the negative used in the irradiation step. Said image is resistant to solvents, acids, alkalies, water, etc., as well as to abrasion, mechanical stresses and the like and hence possesses obvious advantages over images prepared by hitherto conventional reproduction processes.

The processes by which the isocyanates (I) and amines (II) are incorporated into such photosensitive polymers include the various processes known in the art for making supported and unsupported films of polyurethanes, polyamides and the like, supra, as well as those described in, for example, U.S. Patent 2,948,706. The latter patent is also representative of the procedures known in the art for the utilization of photosensitive polymers in the above-discussed methods of reproduction. Said procedures can be readily adapted to the same use of photosensitive polymers prepared from the isocyanates (I) and the amines (II) in accordance with this invention. Further illustrative of the methods by which the compounds (I) and (II) can be incorporated into light sensitive polymers are those discussed in detail by J. Korsar, Light Sensitive Systems, John Wiley and Sons, Inc. New York, 1965, particularly at pp. 137–157.

DETAILED DESCRIPTION OF THE INVENTION

The novel isocyanates of the Formula I are obtained conveniently by phosgenation of the corresponding amines of Formula II. The phosgenation can be effected by any of the procedures conventionally employed in the art to convert an aromatic amine to the corresponding isocyanate. Such procedures are described, for example, by Siefken, Annalen, 562, 75 et seq., 1949. Illustratively, the free amine (II) or an acid addition salt thereof such as the hydrochloride, hydrobromide, and the like, is treated with phosgene in the presence of an inert organic solvent such as benzene, toluene, xylene, naphthalene, decalin, chlorobenzene, o-dichlorobenzene, bromobenzene, o-chlorotoluene, and the like. The reaction is conducted advantageously at elevated temperatures and preferably at temperatures of the order of 100° C. to 200° C. The phosgene is conveniently employed in approximately stoichiometric proportions but an excess of phosgene can be employed if desired.

The cis- and trans- isomers of the isocyanates (I) are obtained by phosgenation of the corresponding cis- and trans- isomers of the corresponding amine (II). For example, the cis isomer of any given amine (II) will yield exclusively the corresponding cis isomer of the corresponding isocyanate (I). Similarly, the trans isomer of any given amine (II) will yield exclusively the trans isomer of the corresponding isocyanate (I). Where the starting amine (II) is a mixture of cis and trans isomers, the corresponding isocyanate (I) obtained therefrom by phosgenation will likewise be a mixture of cis and trans isomers, the proportion of said isomers in the isocyanate (I) corresponding to the proportion of said isomers in the starting amine.

Where the isocyanate (I) is obtained in the form of a mixture of the cis and trans isomers said mixture can, if desired, be separated into its components by conventional procedures such as by fractional crystallization, counter-current distribution, chromatography, and like techniques.

The amines of the Formula II which are themselves novel compounds falling within the scope of this invention, as well as being intermediates in the synthesis of the corresponding isocyanates (I), can be prepared from readily available starting materials. For example, said amines can be prepared by reduction of the corresponding nitrostilbenes (III) using reduction conditions conventional in the art for the reaction of aromatic nitrol compounds without simultaneous reduction of the olefinic double bond present in the molecule. Illustrative of said reduction conditions are the use of stannous chloride in the presence of hydrochloric acid under the conditions described, for example, by Peck et al., J. Am. Chem. Soc. 74, 468, 1952 for the reduction of 4-dimethylamino-4'-nitrostilbene to 4-dimethylamino-4'-aminostilbene; the use of aqueous ferrous sulfate in the presence of ammonium hydroxide; the use of Raney nickel; the use of titanous chloride or titanous sulfate in the presence of hydrochloric acid or sulfuric acid, respectively; and the use of metallic tin, zinc or iron in the presence of hydrochloric acid.

As in the case of the isocyanates (I), the amines (II) can exist in both cis and trans forms. The cis form of the amine (II) is obtained when the cis form of the corresponding nitro compound is reduced by any of the conventional reduction methods such as those illustrated above. The reduction does not in any way affect the stereo configuration at the double bond. Similarly, reduction of the trans nitro compound yields the corresponding trans amino compound and reduction of a mixture of cis and trans isomers of the nitro compound gives a corresponding mixture of cis and trans isomers of the amino compound. The individual isomers can be isolated from mixtures thereof, if desired, using procedures conventional in the art such as those set forth above in regard to separation of the isomeric forms of the isocyanates (I).

The nitro compounds which are employed as starting materials in the synthesis of the amines (II) can be represented by the formula:

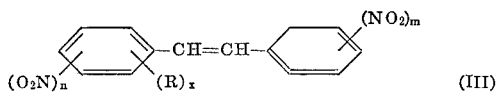

wherein R, n, m, and x have the significance hereinbefore defined. Said nitro compounds (III) can be prepared by conventional procedures. For example, said nitro compounds (III) can be prepared by condensing the appropriate aldehyde

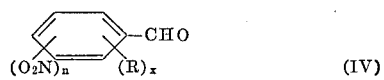

wherein R, x, and n have the significance hereinbefore defined, with (i) the appropriate nitrotoluene

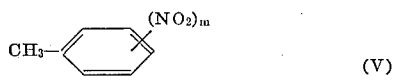

wherein m has the significance hereinbefore defined, or with (ii) the appropriate nitrophenylacetic acid

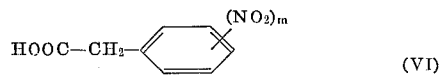

wherein m has the significance hereinbefore defined. Said condensation is generally carried out in the presence of piperidine or like secondary aliphatic amines. The condensation of said aldehyde (IV) and said nitrotoluene (V) can be carried out, illustratively, under the conditions described by Peck et al., supra, for the condensation of 4-nitro-o-xylene with p-dimethylaminobenzaldehyde in the presence of piperidine to prepare 4-dimethylamino-2'-methyl-4'-nitrostilbene.

The condensation of the above aldehyde (IV) and the nitrophenylacetic acid (VI) generally occurs with intermediate formation of the corresponding cinnamic acid of the formula:

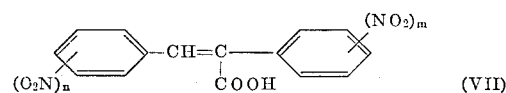

wherein n and m have the significance hereinbefore defined. Said cinnamic acid can be isolated and subsequently decarboxylated by heating or it can be decarboxylated in situ by carrying out the final stages of the condensation of aldehyde and phenylacetic acid at temperatures above that at which decarboxylation commences. Typical of the latter procedures is that described by Kaufman, Berichte, 54, 795, 1921. Where piperidine is employed as catalyst, this latter procedure generally gives rise exclusively to the trans isomer of the desired nitrostilbene (III). The method in which the intermediate cinnamic acid (VII) is isolated prior to decarboxylation has the advantage that it enables either the cis or trans isomer of the desired nitrostilbene (III) to be isolated by suitable choice of decarboxylation conditions. As shown by Ulrich et al., J. Org. Chem. 31, 4146, 1966, decarboxylation of the cinnamic acid (VII) by heating in inert organic solvents such as benzene, toluene, and the like, in the presence of piperidine or morpholine gives rise to the trans-isomer of the nitrostilbene (III). Decarboxylation of the cinnamic acid (VII) in the presence of copper chromite in quinoline solution yields the cis-isomer of the corresponding nitrostilbene (III).

The benzaldehydes (IV), the nitrotoluenes (V) and the nitrophenylacetic acids (VI) which are employed as starting materials in the above synthesis are for the most part known in the art and can be prepared by general procedures well-recognized in the art. Illustratively, methods for the preparation of the benzaldehydes (IV), the nitrotoluenes (V) and the nitrophenylacetic acids (VI) are summarized at pages 507 et seq., pages 135 et seq., and pages 593 et seq., respectively, of Chemistry of Carbon Compounds, Edited by E. H. Rodd, vol. IIIA, Elsevier, New York, 1954.

The following examples describe the manner and process of making and using the invention and set forth the best mode contemplated by the inventors of carrying out the invention but are not to be construed as limiting.

EXAMPLE 1

Trans-2,5-dimethoxy-4'-aminostilbene

A solution of 70 g. of ferrous sulfate in 100 ml. of water was heated to the boiling point and stirred while a total of 100 ml. of aqueous 58% ammonium hydroxide and a solution of 5 g. of trans-2,5-dimethoxy-4'-nitrostilbene (Ulrich et al., supra) in 200 ml. of methanol were added simultaneously, as separate streams, over a period of 15 minutes. After the addition was complete, the resulting dark solution was heated with stirring at 65° C. to 70° C. for a further 2 hours. The product so obtained was heated on a steam bath to remove methanol and ammonia and the residue was extracted with four portions, each of 100 ml., of ether. The ethereal extracts were combined, washed with water, and dried over anhydrous magnesium sulfate. The dried solution was filtered and the filtrate was evaporated to dryness. The residue (3 g.: M.P. 89 to 91° C.) was recrystallized from ethanol to give trans-2,5-dimethoxy-4'-aminostilbene in the form of a yellow crystalline solid having a melting point of 91° C. to 92° C. The infrared spectrum of this material (CHCl₃ solution) exhibited maxima at 2.75 and 2.95μ (—NH₂ stretching vibration), 6.18μ (C=C stretching vibration), and 10.35μ (=CH out of plane deformation).

Using the above procedure, but replacing trans-2,5-dimethoxy-4'-nitrostilbene by the corresponding cis-isomer (Ulrich et al., supra), there is obtained cis-2,5-dimethoxy-4'-aminostilbene.

Trans-2,5-dimethoxy-4'-aminostilbene was also prepared as follows:

A mixture of 6 g. of trans-2,5-dimethoxy-4'-nitrostilbene, 250 ml. of methanol and 1 g. of Raney nickel was hydrogenated in a Parr hydrogenator using an initial pressure of hydrogen of 50 p.s.i. The theoretically required amount of hydrogen was taken up in 2.5 hours. The resulting mixture was filtered and the filtrate was evaporated to dryness. The residue (5.35 g.) was a yellow solid which was recrystallized from isopropyl alcohol to give 4.8 g. of trans-2,5-dimethoxy-4'-aminostilbene in the form of a yellow crystalline solid having a melting point of 90° C. to 92° C.

EXAMPLE 2

Trans-2,5-dimethoxy-4'-isocyanatostilbene

A total of 1800 ml. of phosgene was bubbled into 2800 ml. of chlorobenzene maintained at 3° C. to 5° C. The resulting solution was maintained at 0° C. to 2° C. with stirring while a solution of 10.0 g. of trans-2,5-dimethoxy-4'-aminostilbene (prepared as described in Example 1) in 75 ml. of chlorobenzene was added dropwise over a period of 15 minutes. When the addition was complete, the resulting mixture was heated at 90° C. to 95° C. for 1.5 hours. Infrared spectroscopic analysis of an aliquot of the resulting solution indicated the absence of —NH— and the appearance of a strong band for —NCO. The resulting solution was purged with nitrogen while heating at 60° C. to 70° C. for 2 hours to remove excess phosgene. The purged solution was distilled under reduced pressure to remove chlorobenzene. The residue was treated with ligroin and the yellow solid which separated was isolated by filtration, washed with ligroin and dried. There was thus obtained 10.1 g. of trans-2,5-dimethoxy-4'-isocyanatostilbene in the form of a yellow crystalline solid having a melting point of 68° C. to 70° C. Two grams of this material was dissolved in 15 ml. of hot ligroin-benzene (9:1 v./v.) and the solution separated from a small insoluble sticky residue. Upon cooling of the filtrate there separated 1.5 g. (75% recovery) of yellow needles having a melting point of 69.5 to 70.5° C. The infrared spectrum of this material (CCl₄ solution) exhibited maxima at 4.45μ (N=C=O stretching vibration), 6.12μ (C=C stretching vibration), and 10.35μ (=CH out of plane deformation).

A portion of the isocyanate so obtained was converted to the corresponding methyl urethane as follows:

A solution of 8 g. of the trans-2,5-dimethoxy-4'-isocyanatostilbene in 100 ml. of methanol was heated under reflux for 2 hours and the resulting mixture was allowed to stand at room temperature (circa 20° C.) overnight. The solid which had separated was isolated by filtration and washed with methanol to give 7.65 g. of urethane. A second crop (1.2 g.) was obtained by concentration of the mother liquors. The combined crops of material were recrystallized from methanol to yield the methylurethane of trans-2,5-dimethoxy-4'-isocyanatostilbene in the form of a yellow solid having a melting point of 130° C. to 132° C. The infrared spectrum of this material (CHCl₃ solution) exhibited maxima at 2.92μ (—NH—), 10.32μ (=CH out of plane deformation).

Analysis.—Calcd. for $C_{18}H_{19}NO_4$ (percent): C, 68.99; H, 6.11; N, 4.47. Found (percent): C, 68.96; H, 6.33; N, 4.57.

The above material exhibited an intense blue fluorescence when a 0.1% by weight solution thereof in methanol was irradiated with ultraviolet light. In contrast a methanol solution of the same concentration of the known methyl carbamate of 4-isocyanatostilbene exhibited very weak fluorescence under comparable conditions.

Using the procedures set forth above, but replacing trans-2,5-dimethoxy-4'-isocyanatostilbene by cis-2,5-dimethoxy-4'-isocyanatostilbene (prepared as described in Example 1), there was obtained cis-2,5-dimethoxy-4'-isocyanatostilbene and the methylurethane thereof.

EXAMPLE 3

Trans-2,5-dimethoxy-2',4'-diaminostilbene (A) Trans-2,5-dimethoxy-2',4'-dinitrostilbene.—A mixture of 28.19 g. of 2,5-dimethoxybenzaldehyde, 27.0 g. of 2,4-dinitrotoluene and 30 drops of piperidine in 200 ml. of chlorobenzene was heated under reflux for one hour. At the end of this time 100 ml. of the solvent was collected using water separator (2 hours). The rest of the solvent was then removed by distillation under reduced pressure and the residue was cooled and treated with 200 ml. of ethanol. The solid which separated was isolated by filtration, washed with ethanol and dried. The product so obtained (17.0 g.) was recrystallized from ethyl acetate. There was thus obtained trans-2,5-dimethoxy-2',4'-dinitrostilbene in the form of an orange crystalline solid having a melting point of 175° C. to 177° C. The infrared spectrum (CHCl₃ solution) of this material exhibited maxima at 7.42μ (symmetrical —NO₂ stretch) and 10.36μ (=CH out of plane deformation).

(B) Trans-2,5-dimethoxy - 2',4' - diaminostilbene.—A mixture of 6 g. of the trans-2,5-dimethoxy-2',4'-dinitrostilbene (prepared as described in Part A) and 2 g. of Raney nickel in 300 ml. of methanol was placed in an autoclave (capacity 500 ml.) and hydrogenated using an initial hydrogen pressure of 50 p.s.i. The theoretical amount of hydrogen had been absorbed after one hour and 7 minutes. At the end of this period the autoclave was flushed with nitrogen and opened. The resulting product was filtered to remove catalyst and the filtrate was evaporated to dryness to yield 4.97 g. of trans-2,5-dimethoxy-2',4'-diaminostilbene in the form of a brown liquid. The infrared spectrum of the material (CHCl₃ solution) exhibited maxima at 2.90μ and 2.95μ (—NH₂) and 10.35μ (=CH out of plane deformation).

A sample of the above diamine was treated with excess acetic anhydride. The diamine went into solution and, almost immediately, a white solid separated. After stirring the mixture with water for a short period, the white solid was isolated by filtration, washed with water and dried. The dried material was recrystallized from hot ethanol. There was thus obtained trans-2,5-dimethoxy-2',4'-di-(acetamido)stilbene in the form of a white crystalline solid having a melting point of 256° C. to 258° C. The infrared spectrum of this material (KBr pellet) exhibited maxima at 2.95μ and 3.06μ (—NH—); 1043μ (=CH out of plane deformation).

Analysis.—Calcd. for $C_{20}H_{22}N_2O_4$ (percent): C, 67.78; H, 6.26; N, 7.91. Found (percent): C, 67.72; H, 6.45; N, 7.82.

It was observed that the diacetamido compound so obtained exhibited an intense blue fluorescence, when irradiated with an ultraviolet lamp, both in the solid state and in solution.

EXAMPLE 4

Trans-2,5-dimethoxy-2',4'-diisocyanatostilbene

Using the procedure described in Example 2, but replacing trans-2,5-dimethoxy-4'-aminostilbene by trans-2,5-dimethoxy-2',4'-diaminostilbene (prepared as described in Example 3), there was obtained trans-2,5-dimethoxy-2',4'-diisocyanatostilbene in the form of a yellow crystalline solid having a melting point of 80° C. to 84° C. The infrared spectrum of this material (CHCl₃ solution) exhibited maxima at 4.45μ (—N=C=O stretching vibration) and 10.30μ (=CH out of plane deformation).

Using the procedure also described in Example 2, the above diisocyanate was converted to the corresponding methylurethane. The trans-2,5-dimethoxy-2',4'-di(methylcarbamato)stilbene so obtained was a white crystalline solid having a melting point of 193° C. to 194.5° C.

*Analysis.*—Calcd. for $C_{20}H_{22}N_2O_6$ (percent): C, 62.16; H, 5.74; N, 7.25. Found (percent): C, 62.16; H, 5.72; N, 7.30.

EXAMPLE 5

Cis-2,5-dimethoxy-2',4'-diaminostilbene (A) Cis-2,5-dimethoxy - 2',4'-dinitrostilbene.—Following the procedure described by Ulrich et al., supra, for the preparation of cis-2,5-dimethoxy-4'-nitrostilbene, 2,5-dimethoxybenzaldehyde is condensed with 2,4- dinitrophenylacetic acid in refluxing benzene solution in the presence of piperidine to yield 2-(2,4-dinitrophenyl)-trans-2,5-dimethoxycinnamic acid. The latter is then decarboxylated by adding the acid to a mixture of copper chromite and quinoline at 205° C. to 255° C. to yield cis-2,5-dimethoxy-2',4'-dinitrostilbene.

(B) Cis-2,5-dimethoxy - 2',4'-diaminostilbene.—Using the procedure described in Example 3, Part B, but replacing trans-2,5-dimethoxy-2',4'-dinitrostilbene by cis-2,5-dimethoxy-2',4'-dinitrostilbene, there is obtained cis-2,5-dimethoxy-2',4'-diaminostilbene in the form of a yellow crystalline solid.

EXAMPLE 6

Cis-2,5-dimethoxy-2',4'-diisocyanatostilbene

Using the procedure described in Example 2, but replacing trans-2,5-dimethoxy-4'-aminostilbene by cis-2,5-dimethoxy-2',4'-diaminostilbene, there is obtained cis-2,5-dimethoxy-2',4'-diisocyanatostilbene.

EXAMPLE 7

Trans-3,4,5-trimethoxy-2',4'-diaminostilbene (A) Trans - 3,4,5 - trimethoxy-2',4'-dinitrostilbene.— Using the procedure described in Example 3, Part A, but replacing 2,5-dimethoxybenzaldehyde by the known 3,4,5-trimethoxybenzaldehyde, there is obtained trans-3,4,5-trimethoxy-2',4'-dinitrostilbene.

(B) Trans - 3,4,5 - trimethoxy-2',4'-diaminostilbene.— Using the procedure described in Example 3, Part B, but replacing trans - 2,5 - dimethoxy-2',4'-dinitrostilbene by trans-3,4,5-trimethoxy-2',4'-dinitrostilbene, there is obtained trans-3,4,5-trimethoxy-2',4'-diaminostilbene.

Similarly, using the procedure described in Example 3, Part A, but replacing 2,5-dimethoxybenzaldhyde by the following known compounds: 4-butoxybenzaldehyde, 2-butoxy - 3 - ethoxybenzaldehyde, 2,3-diethoxybenzaldehyde, 3,4-diisopropoxybenzaldehyde, 3,4-dimethoxybenzaldehyde, 4-ethoxy-2,6-dimethoxybenzaldehyde, 3-ethoxy-2-hexyloxybenzaldehyde, 3 - ethoxy-2-pentyloxybenzaldehyde, 2-isobutoxy-3-methoxybenzaldehyde, 5-nitro-2-pentyloxybenzaldehyde, and 2,4,6-trimethoxybenzaldehyde there are obtained trans-4-butoxy-2',4'-dinitrostilbene,
trans-2-butoxy-3-ethoxy-2',4'-dinitrostilbene,
trans-2,3-diethoxy-2',4'-dinitrostilbene,
trans-3,4-diisopropoxy-2',4'-dinitrostilbene,
trans-3,4-dimethoxy-2',4'-dinitrostilbene,
trans-4-ethoxy-2,6-dimethoxy-2',4'-dinitrostilbene,
trans-3-ethoxy-2-hexyloxy-2',4'-dinitrostilbene,
trans-3-ethoxy-2-pentyloxy-2',4'-dinitrostilbene,
trans-2-isobutoxy-3-methoxy-2',4'-dinitrostilbene,
trans-2-pentyloxy-2',4',5-trinitrostilbene, and
trans-2,4,6-trimethoxy-2',4'-dinitrostilbene, respectively.

The latter nitro compounds are then reduced, using the procedure described in Example 3, Part B, to the corresponding amines, namely, trans-4-butoxy-2',4'-diaminostilbene,
trans-2-butoxy-3-ethoxy-2',4'-diaminostilbene,
trans-2,3-diethoxy-2',4'-diaminostilbene,
trans-3,4-diisopropoxy-2',4'-diaminostilbene,
trans-3,4-dimethoxy-2',4'-diaminostilbene,
trans-4-ethoxy-2,6-dimethoxy-2',4'-diaminostilbene,
trans-3-ethoxy-2-hexyloxy-2',4'-diaminostilbene,
trans-3-ethoxy-2-pentyloxy-2',4'-diaminostilbene,
trans-2-isobutoxy-3-methoxy-2',4'-diaminostilbene,
trans-2-pentyloxy-2',4',5-triaminostilbene, and
trans-2,4,6-trimethoxy-2',4'-diaminostilbene.

EXAMPLE 8

Trans-3,4,5-trimethoxy-2',4'-diisocyanatostilbene

Using the procedure described in Example 2, but replacing trans-2,5-dimethoxy-4'-aminostilbene by trans-3,4,5-trimethoxy-2',4'-diaminostilbene, there is obtained trans-3,4,5-trimethoxy-2',4'-diisocyanatostilbene.

Similarly, using the procedure described in Example 2, but replacing trans-2,5-dimethoxy-4'-aminostilbene by any of the amines prepared in Example 7, there are obtained the corresponding isocyanates, namely:

trans-4-butoxy-2',4'-diisocyanatostilbene,
trans-2-butoxy-3-ethoxy-2',4'-diisocyanatostilbene,
trans-2,3-diethoxy-2',4'-diisocyanatostilbene,
trans-3,4-diisopropoxy-2',4'-diisocyanatostilbene,
trans-3,4-dimethoxy-2',4'-diisocyanatostilbene,
trans-4-ethoxy-2,6-dimethoxy-2',4'-diisocyanatostilbene,
trans-3-ethoxy-2-hexyloxy-2',4'-diisocyanatostilbene,
trans-3-ethoxy-2-pentyloxy-2',4'-diisocyanatostilbene,
trans-2-isobutoxy-3-methoxy-2',4'-diisocyanatostilbene,
trans-2-pentyloxy-2',4',5-triisocyanatostilbene, and
trans-2,4,6-trimethoxy-2',4'-diisocyanatostilbene.

EXAMPLE 9

Cis-3,4,5,-trimethoxy-4'-aminostilbene (A) cis-3,4,5-trimethoxy-4'-nitrostilbene. — Following the procedure described by Ulrich et al., supra, for the preparation of cis-2,5-dimethoxy-4'-nitrostilbene, but replacing 2,5-dimethoxybenzaldehyde by 3,4,5-trimethoxybenzaldehyde, there is obtained cis-3,4,5-trimethoxy-4'-nitrostilbene.

(B) cis-3,4,5-trimethoxy-4'-aminostilbene. — Using the procedure described in Example 4, Part B, but replacing trans-2,5-dimethoxy-2',4'-dinitrostilbene by cis-3,4,5 - trimethoxy-4'-nitrostilbene, there is obtained cis-3,4,5-trimethoxy-4'-aminostilbene.

Similarly, using the procedure described by Ulrich et al., supra, for the preparation of cis-2,5-dimethoxy-4'-nitrostilbene, but replacing 2,5-dimethoxybenzaldehyde by 4-butoxybenzaldehyde, 2-butoxy - 3 - ethoxybenzaldehyde, 2,3-diethoxybenzaldehyde, 3,4-diisopropoxybenzaldehyde, 3,4-dimethoxybenzaldehyde, 4-ethoxy-2,6-dimethoxybenzaldehyde, 3-ethoxy-2-hexyloxybenzaldehyde, 3-ethoxy-2-pentyloxybenzaldehyde, 2-isobutoxy-3-methoxybenzaldehyde, 5-nitro-2-pentyloxybenzaldehyde, or 2,4,6-trimethoxybenzaldehyde, there are obtained:

cis-4-butoxy-4'-nitrostilbene,
cis-2-butoxy-3-ethoxy-4'-nitrostilbene,
cis-2,3-diethoxy-4'-nitrostilbene,
cis-3,4-diisopropoxy-4'-nitrostilbene,
cis-3,4-dimethoxy-4'-nitrostilbene,
cis-4-ethoxy-2,6-dimethoxy-4'-nitrostilbene,
cis-3-ethoxy-2-hexyloxy-4'-nitrostilbene,
cis-3-ethoxy-2-pentyloxy-4'-nitrostilbene,
cis-2-isobutoxy-3-methoxy-4'-nitrostilbene,
cis-2-pentyloxy-4',5-dinitrostilbene, and
cis-2,4,6-trimethoxy-4'-nitrostilbene, respectively.

The latter nitro compounds are then reduced, using the procedure described in Example 3, Part B, to the corresponding amines, namely:

cis-4-butoxy-4'-aminostilbene,
cis-2-butoxy-3-ethoxy-4'-aminostilbene,
cis-2,3-diethoxy-4'-aminostilbene,
cis-3,4-diisopropoxy-4'-aminostilbene,
cis-3,4-dimethoxy-4'-aminostilbene,
cis-4-ethoxy-2,6-dimethoxy-4'-aminostilbene,
cis-3-ethoxy-2-hexyloxy-4'-aminostilbene,
cis-3-ethoxy-2-pentyloxy-4'-aminostilbene,
cis-2-isobutoxy-3-methoxy-4'-aminostilbene,
cis-2-pentyloxy-4',5-diaminostilbene, and
cis-2,4,6-trimethoxy-4'-aminostilbene.

EXAMPLE 10

Cis-3,4,5-trimethoxy-4'-isocyanatostilbene

Using the procedure described in Example 2, but replacing trans-2,5-dimethoxy-4'-aminostilbene by cis-3,4,5-trimethoxy-4'-aminostilbene, there is obtained cis-3,4,5-trimethoxy-4'-isocyanatostilbene.

Similarly, using the procedure described in Example 2, but replacing trans-2,5-dimethoxy-4'-aminostilbene by any of the amines listed in Example 9, there are obtained the corresponding isocyanates, namely:

cis-4-butoxy-4'-isocyanatostilbene,
cis-2-butoxy-3-ethoxy-4'-isocyanatostilbene,
cis-2,3-diethoxy-4'-isocyanatostilbene,
cis-3,4-diisopropoxy-4'-isocyanatostilbene,
cis-3,4-dimethoxy-4'-isocyanatostilbene,
cis-4-ethoxy-2,6-dimethoxy-4'-isocyanatostilbene,
cis-3-ethoxy-2-hexyloxy-4'-isocyanatostilbene,
cis-3-ethoxy-2-pentyloxy-4'-isocyanatostilbene,
cis-2-isobutoxy-3-methoxy-4'-isocyanatostilbene,
cis-2-pentyloxy-4',5-diisocyanatostilbene, and
cis-2,4,6-trimethoxy-4'-isocyanatostilbene.

EXAMPLE 11

Cis- and trans-2,5-dimethoxy-3'-aminostilbene (A) cis- and trans-2,5-dimethoxy-3'-nitrostilbene.—Using the procedure described by Ulrich et al., supra, for the preparation of both cis- and trans-2,5-dimethoxy-4'-nitrostilbene, but replacing the 4-nitrophenylacetic acid used as starting material by 3-nitrophenylacetic acid, there are obtained the cis- and trans-isomers of 2,5-dimethoxy-3'-nitrostilbene.

(B) cis- and trans-2,5-dimethoxy-3'-aminostilbene.—Using the procedure described in Example 3, Part B, but replacing the trans-2,5-dimethoxy-2',4'-dinitrostilbene by the cis- and trans-isomers of 2,5-dimethoxy-3'-nitrostilbene, there are obtained the cis- and trans-isomers of 2,5-dimethoxy-3'-aminostilbene.

EXAMPLE 12

Cis- and trans-2,5-dimethoxy-3'-isocyanatostilbene

Using the procedure described in Example 2, but replacing trans-2,5-dimethoxy-4'-aminostilbene by the cis- and trans-isomers of 2,5-dimethoxy-3'-isocyanatostilbene, there are obtained the cis- and trans-isomers of 2,5-dimethoxy-3'-isocyanatostilbene.

EXAMPLE 13

The photosensitivity of the methylurethanes derived from the hitherto known trans - 4 - isocyanatostilbene (Bertsch et al., J. prakt. Chem. (4), 11, 225, 1960) and from the trans-2,5-methoxy-4'-isocyanatostilbene (prepared as described in Example 2) was compared by exposing each material, as a 10% by weight solution in benzene, to irradiation using the method described by Schönberg, Präparative Organische Photochemi, p. 24, Springer Verlag, Berlin, 1958. The amount of dimer, formed after various periods of irradiation in each case was measured using gel permeation chromatography. The results obtained are shown in the following table:

| Compound | Period of irradiation mins. | Amount of dimer formed percen. |
|---|---|---|
| Trans 2,5 dimethoxy-4'-isocyanatostilbene methyl urethane | 15 | 13 |
|  | 30 | 21 |
|  | 120 | 74 |
| Trans-4-isocyanatostilbene methylurethane | 15 | (¹) |
|  | 30 | <3 |
|  | 120 | 27 |

¹ Not measured.

EXAMPLE 14

Trans-2-methoxy-4'-aminostilbene (A) Trans-2-methoxy-4'-nitrostilbene.—A mixture of 10.0 g. (0.073 mole) of o-methoxybenzaldehyde, 13.3 g. (0.073 mole) of p-nitrophenylacetic acid, 1.4 ml. of piperidine and 100 ml. of chlorobenzene was heated under reflux for 3 hours. At the end of this time the chlorobenzene was removed by distillation under reduced pressure. To the residue was added 50 ml. of piperidine and the resulting mixture was heated under reflux for one hour. At the end of this time the piperidine was removed by distillation under reduced pressure and the residue was treated with 50 ml. of ethanol. The yellow solid which separated was isolated by filtration, washed with ethanol and dried. There was thus obtained 9.0 g. of trans-2-methoxy-4'-nitrostilbene in the form of a yellow solid having a melting point of 122° C.

A second run was carried out in exactly the same manner using double the quantity of each reactant set forth above. The material from both runs was combined and recrystallized from isopropanol to obtain recrystallized trans-2-methoxy-4'-nitrostilbene having a melting point of 121° C. to 122° C.

(B) Trans-2-methoxy-4'-aminostilbene.—A solution of 6 g. of trans-2-methoxy-4'-nitrostilbene in 300 ml. of methanol was hydrogenated in the presence of 1 g. of Raney nickel. The initial pressure of hydrogen was 50 p.s.i. Hydrogenation was complete in 6 hours. At the end of this time the catalyst was removed by filtration and the filtrate was evaporated to dryness to leave 4.95 g. of trans-2-methoxy-4'-aminostilbene. A portion of this material was converted to the corresponding N-acetyl derivative, melting point 135° C. to 137° C. by treatment with excess acetic anhydride followed by addition of the reaction mixture to water.

Using the procedure set forth in Example 5, Part A, but replacing the 2,5-dimethoxybenzaldehyde used therein by 2-methoxybenzaldehyde there is prepared cis-2-methoxy-4'-nitrostilbene which is then hydrogenated using the procedure described in Example 14, Part B to obtain cis-2-methoxy-4'-aminostilbene.

EXAMPLE 15

Trans-2-methoxy-4'-isocyanatostilbene

A total of 1000 ml. of phosgene was passed into 200 ml. of chlorobenzene maintained at 0° C. to 2° C. To the resulting mixture was added, over a period of 12 minutes, a solution of 6 g. of trans-2-methoxy-4'-aminostilbene in 100 ml. of chlorobenzene. The temperature of the reaction mixture was maintained between 1° C. and 4° C. during the addition. After the addition was complete the mixture was heated at 90° C. to 95° C. for 1.5 hours and thereafter was purged of phosgene by passage of nitrogen for 1.5 hours. The resulting purged mixture was filtered and evaporated to dryness under reduced pressure. The yellow crystalline residue which remained was washed with ligroin, isolated by filtration and dried. There was thus obtained trans-2-methoxy-4'-isocyanatostilbene in the form of a light brown liquid.

A portion of said isocyanate was converted to the corresponding methylurethane by refluxing with methanol. The methylurethane so obtained was a white crystalline solid having a melting point of 127° C. to 129° C. after recrystallization from methanol.

Similarly, using the above phosgenation procedure, but replacing trans-2-methoxy-4'-aminostilbene by cis - 2 - methoxy-4'-aminostilbene, there is obtained cis 2-methoxy-4'-isocyanatostilbene.

EXAMPLE 16

Trans-4-methoxy-4'-aminostilbene (A) Trans-4-methoxy-4'-nitrostilbene.—A mixture of 10 g. (0.073 mole) of p-methoxybenzaldehyde, 13.3 g. (0.073 mole) of p-nitrophenylacetic acid and 1.4 ml. of piperidine in 100 ml. of chlorobenzene was heated under reflux for 4 hours using a water trap. At the end of this time the solvent was removed by distillation under reduced pressure. The yellow solid which separated was isolated by filtration, washed with ethanol and dried. There was thus obtained 12 g. of trans-4-nitro-4'-methoxystilbene-α-carboxylic acid in the form of a crystalline solid having a melting point of 246° C. to 248° C. The acid so obtained was heated under reflux for 1.5 hours with 50 ml. of piperidine. The resulting solution was evaporated under reduced pressure and the residue was treated with ethanol. The solid was isolated by filtration, washed with ethanol and dried. There was thus obtained 3.3 g. of trans-4-methoxy-4'-nitrostilbene in the form of a crystalline solid having a melting point of 133° C. to 134° C. (Pfeiffer, Berichte, 48, 1793 gives melting point of 133° C. to 134° C. for this compound).

Similarly, trans-4-nitro-4'-methoxystilbene - α - carboxylic acid was prepared in accordance with the first part of the above procedure and was decarboxylated by adding it to a mixture of copper chromite and quinoline at 205° C. to 255° C. in accordance with the procedure of Ulrich et al., supra, to yield cis-4-methoxy-4'-nitrostilbene.

(B) Trans-4-methoxy-4'-aminostilbene.—The trans-4-methoxy-4'-nitrostilbene obtained as described above was reduced using Raney nickel in accordance with the procedure described in Example 14, Part B above, to obtain trans-4 methoxy-4'-aminostilbene in the form of a crystalline solid which, after recrystallization from isopropanol, had a melting point of 170° C. to 171° C. (Pfeiffer, supra, gives a melting point of 173° C. to 174° C. for this compound).

Similarly, using the procedure described in Example 14, Part B above, but replacing trans-2-methoxy-4'-nitrostilbene by cis-4-methoxy-4'-nitrostilbene, there is obtained cis-4-methoxy-4'-aminostilbene.

EXAMPLE 17

Trans-4-methoxy-4'-isocyanatostilbene

Using the procedure described in Example 15, but replacing trans-2-methoxy-4'-aminostilbene by trans-4-methoxy-4'-aminostilbene, there was obtained trans-4-methoxy-4'-isocyanatostilbene in the form of a crystalline solid having a melting point of 163° C. to 166° C. The corresponding methylurethane having a melting point of 190° C. to 191° C. was obtained by refluxing the isocyanate in methanol for a short period and isolating the solid which separated.

Similarly, using the procedure described in Example 15, but replacing trans-2-methoxy-4'-aminostilbene by cis-4-methoxy-4'-aminostilbene, there is obtained cis-4-methoxy-4'-isocyanatostilbene.

EXAMPLE 18

Cis- and trans-2-methoxy-2',4'-diaminostilbene

Using the procedure described in Example 3, Parts A and B, but replacing the 2,5-dimethoxybenzaldehyde used as starting material in Part A by 2-methoxybenzaldehyde, there was obtained trans-2-methoxy-2',4'-diaminostilbene.

Similarly, using the procedure described in Example 5, Parts A and B, but replacing the 2,5-dimethoxybenzaldehyde used as starting material in Part A by 2-methoxybenzaldehyde, there was obtained cis-2-methoxy-2',4'-diaminostilbene.

EXAMPLE 19

Cis- and trans-2-methoxy-2',4'-diisocyanatostilbene

Using the procedure described in Example 2, but replacing trans-2,5-dimethoxy-4'-aminostilbene by cis- and trans-2-methoxy-2',4'-diaminostilbene, there were obtained cis- and trans-2-methoxy-2',4'-diisocyanatostilbene, respectively.

EXAMPLE 20

Cis- and trans-4-methoxy-2',4'-diaminostilbene

Using the procedure described in Example 3, Parts A and B, but replacing the 2,5-dimethoxybenzaldehyde used as starting material in Part A by 4-methoxybenzaldehyde, there was obtained trans-4-methoxy-2',4'-diaminostilbene.

Similarly, using the procedure described in Example 5, Parts A and B, but replacing the 2,5-dimethoxybenzaldehyde used as starting material in Part A by 4-methoxybenzaldehyde, there was obtained cis-4-methoxy-2',4'-diaminostilbene.

EXAMPLE 21

Cis- and trans-4-methoxy-2',4'-diisocyanatostilbene

Using the procedure described in Example 2, but replacing trans-2,5-dimethoxy-4'-aminostilbene by cis- and trans-4-methoxy-2',4'-diaminostilbene, there were obtained cis- and trans-4-methoxy-2',4'-diisocyanatostilbene, respectively.

We claim:

1. A compound having the formula:

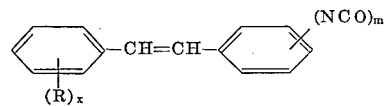

wherein R represents lower-alkoxy, $m$ is an integer from 1 to 2, and $x$ is an integer from 1 to 3.

2. A compound according to claim 1, said compound being 4-isocyanato-2',5'-dimethoxystilbene.

3. A compound according to claim 2 having the trans configuration.

4. A compound according to claim 2 having the cis configuration.

5. A compound according to claim 1, said compound being 2,4-diisocyanato-2',5'-dimethoxystilbene.

6. A compound according to claim 5 having the trans configuration.

7. A compound according to claim 5 having the cis configuration.

8. A compound according to claim 1, said compound being 2-methoxy-4'-isocyanatostilbene.

9. A compound according to claim 8 having the cis configuration.

10. A compound according to claim 8 having the trans configuration.

11. A compound according to claim 1, said compound being 4-methoxy-4'-isocyanatostilbene.

12. A compound according to claim 11 having the cis configuration.

13. A compound according to claim 11 having the trans configuration.

15

14. A compound according to claim 1, said compound being 2-methoxy-2',4'-diisocyanatostilbene.

15. A compound according to claim 14 having the cis configuration.

16. A compound according to claim 14 having the trans configuration.

17. A compound according to claim 1, said compound being 4-methoxy-2',4'-diisocyanatostilbene.

18. A compound according to claim 17 having the cis configuration.

19. A compound according to claim 17 having the trans configuration.

References Cited

UNITED STATES PATENTS 2,671,082   3/1954   Stallmann _____ 260—453X

16

OTHER REFERENCES

Bertsch et al., Chemical Abstracts, vol. 55, pp. 6435–6 (1961).

Bertsch et al., Chemical Abstracts, vol. 55, pp. 2104–9 (1961).

Bertsch et al., Chemical Abstracts, vol. 56, pp. 4846–7 (1962).

CHARLES B. PARKER, Primary Examiner

D. H. TORRENCE, Assistant Examiner

U.S. Cl. X.R.

8—115.5, 116.2; 96—88; 117—33.5, 34; 252—301.3; 260—2.5, 75, 77.5, 78, 471, 515, 519, 534, 553, 558, 562, 571, 576, 580, 600, 612, 613; 424—7